Nov. 19, 1957  A. LIPPMAN, JR  2,813,375

METHOD OF MAKING A GLASS SEAL

Original Filed Dec. 27, 1952

*INVENTOR.*
ALFRED LIPPMAN JR.
BY *Toulmin & Toulmin*
ATTORNEYS

United States Patent Office 2,813,375
Patented Nov. 19, 1957

2,813,375

METHOD OF MAKING A GLASS SEAL

Alfred Lippman, Jr., Reserve, La., assignor to The Commonwealth Engineering Company of Ohio, Dayton, Ohio, a corporation of Ohio Original application December 27, 1952, Serial No. 328,208, now Patent No. 2,720,009, dated October 11, 1955. Divided and this application August 16, 1955, Serial No. 528,674

6 Claims. (Cl. 49—81)

This invention relates to seals and more particularly to seal structures for glass and to methods of producing the same.

The air-tight sealing of glass bodies is a problem in many industries. For example in the production of multi-pane windows for use in refrigerators, show-cases, buildings, and the like, it is necessary to provide between the panes of glass a dead air space and this air space must be sufficiently sealed off from the atmosphere to insure that no moisture will enter the unit, as even the moisture of atmospheric air affects the glass detrimentally over a period of time.

This application is a division of application Serial No. 328,208, now Patent No. 2,720,009, filed December 27, 1952.

It has been customary in the production of such multi-pane windows to secure a pair of spaced glass plates by a metal frame in which an organic sealing compound is incorporated for inhibiting the passage of moisture from the atmosphere to the dead air space. In such structures it is necessary to incorporate a silica gel or some other moisture absorbent to insure of long life of the assembly.

It has been proposed also to produce an all glass multi-pane construction by heating a pair of spaced flat plates to a temperature sufficient to render the glass electrically conductive (generally 950–1000° F.) and to then fuse hot semi-circular sections to the ends of the glass panes to form the air space.

Although the operations already set forth may be successfully performed, a problem arises in that the air trapped within the window cools to create a vacuum which causes the large glass plate to buckle inwardly. To offset this it is necessary to drill a small hole in one of the glass plates and to permit the ingress of dry air during the cooling in order to maintain atmospheric pressure within the unit. This hole, it may also be noted, is utilized for the blowing of air into the unit in order to round out the glass section while it is hot and accordingly in such constructions the hole is considered a necessity. Such a hole is generally in the form of a cone having a 3/16 inch diameter at the outside portion and a 1/8 inch diameter on the inside portion.

It is a principal object of this invention to provide a commercial process for the sealing of such holes as that described hereinbefore.

It is an important object of this invention to describe a novel seal structure of high strength which is air and moisture impermeable.

These and other allied objectives of the invention will become apparent from the following description and the accompanying drawing wherein.

Figure 1:
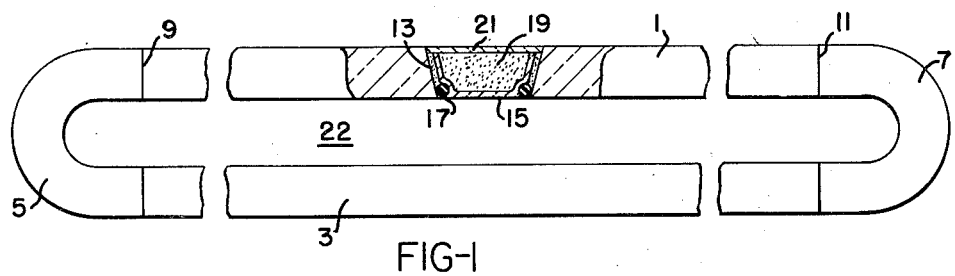
Figure 1 is an elevational view partly in section of an all glass multi-pane window.

Referring to Figure 1 there is shown a pair of spaced glass plates designated 1 and 3, respectively, to which U-shaped glass end members 5, 7 are sealed as at 9 and 11. A port is shown formed in the glass plate 1 and is defined by a conical wall 13 in which there is positioned a cup shaped insert 15. The insert 15 is provided over a lower peripheral portion thereof with a compressible silicone rubber gasket 17 which compressibly engages the wall 13. Securing these components of the seal structure together in intimately adhered relation and air impermeable fashion is a body 19 of a fusible inorganic salt superposed by a film 21 of a low melting glaze.

The inorganic salt may be any readily fusible material having a lower melting point than that of the glass body 1 and a higher melting point than that which occurs at normal atmospheric temperatures, which in the present case may be taken in the range of from minus 40° F. to 130° F. While many salts will fill these requirements it is preferable to use those salts having a melting point of less than 700° F. and greater than about 150° F., for example, potassium or sodium nitrates are suitable or the mixture of these compounds, a mixture of 54 percent potassium nitrate and 46 percent sodium nitrate melts at about 430° F. is eminently suitable for the practice of the invention.

The glaze 21 is preferably a low melting point borosilicate glass, such as those of potassium and sodium, although any low melting point glaze or enamel may be employed. The potassium and sodium borosilicates have the advantage that they blend in readily with the glass body 1 and will be substantially imperceptible to the eye in the structure of invention.

In forming the seal set out in Figure 1 the metallic insert 15 together with the gasket 17 may first be compressibly placed within the port defined by the wall 13; thereafter the salt in fused condition is simply poured over the insert 15, gasket 17 and the wall 13. It is to be noted in this connection that the metal insert 15 should have a degree of flexibility such that when the gasket is compressed against the wall 13 a spacing will be defined between the insert and wall as illustrated.

The fused salt flows rather readily and should be allowed to substantially fill the port. As the salt begins to set, but while it is still heated, the glaze 21 in a molten condition, is applied in a thin film and allowed to set. As the temperature of the glaze will be somewhat higher than that of the salt the upper surface of the setting salt will be refused and will blend with the applied glaze, assuring a firm adherence between these two components. The glaze will also adhere readily to the upper wall of the glass plate 1 which itself, to avoid strains, may be brought to a temperature of about 200° F. to 300° F. in the area immediately adjacent the port.

The seal shown in Figure 1, despite the fact that the salt 19 may be water soluble, completely prevents the entry of moisture to the dead air space 22 since the glaze 21 coats over the salt and the adjacent surface of the glass plate 1. The seal also has a degree of flexibility and will be substantially unaffected by variations in temperature which might normally be expected in use, that is from minus 40° F. to 150° F.

Figure 2:
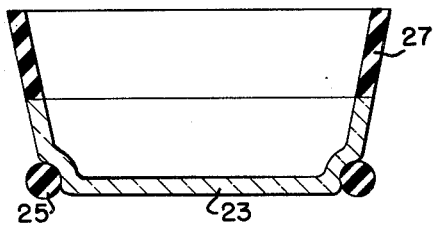
Figure 2 is a sectional view of a novel insert useful in the practice of the invention.

Referring now to Figure 2, there is shown a structure of an insert which is particularly suitable for the practice of invention. The bottom wall 23 of the insert is shown as of glass but may be of metal or any other suitable rigid body material. This base portion is recessed to receive a gasket 25 which may be of silicone or of rubber and would serve the same function as the gasket 17 illustrated in Figure 1.

Figure 3:
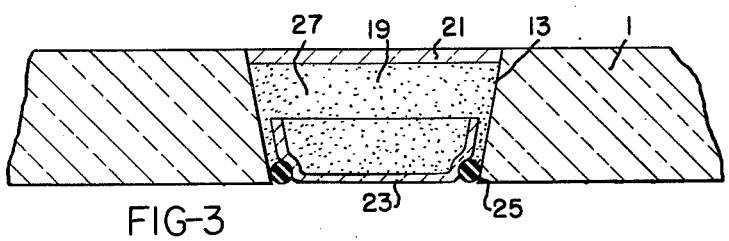
Figure 3 illustrates a seal structure having the insert of Figure 2 therein.

Secured to the upper portion of the wall 23 is a material 27, which is preferably heat deformable, as for example polyethylene. Such a structure finds particular utility in the seal illustrated in Figure 3 wherein the upper wall portion 27 is indicated as deformed throughout the body of the fusible salt 19, the salt being surmounted as in Figure 1 by a layer of moisture impermeable material or glaze 21.

In the formation of this seal the insert of Figure 2 is placed within the port as was described in connection with Figure 1 and upon the pouring of the fused salt over the insert the upper walls in response to the action of the heat tend to flow and spread through the salt body resulting in an extremely strong seal. Thus if polyethylene is used in connection with a mixture containing 54 percent potassium nitrate and 46 percent sodium nitrate (melting point 430° F.) polyethylene of an average molecular weight of about 6000 (melting point 250° F.) will become quite fluid and will set in an integral fashion with the solidifying salt.

Figure 4:
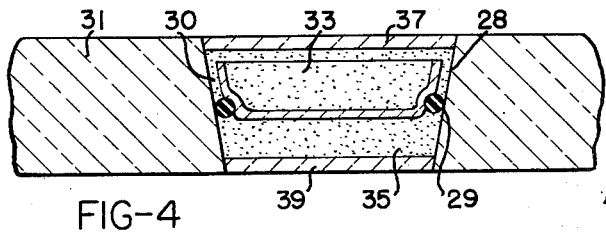
Figure 4 illustrates another embodiment of the seal structure of the invention.

Figure 4 illustrates a seal which is useful in connection with a flat glass plate exposed to the atmosphere on both sides in contrast to the structure shown in Figure 1. Thus the plate 31 is provided with an insert 30 positioned wholly within the body of the port defined by the wall 28. A rubber or silicone insert 29 compressibly engages the port wall to position the insert; salt bodies 33, 35 are filmed over by glazed layers 37, 39, respectively, the seal structure being effected in the same manner as described hereinbefore.

While the seal structure thus described has been shown particularly in connection with tapered holes in order to clearly set forth the solution of the problem with regard to multi-pane windows wherein such tapered ports are normally employed, it is to be understood that the invention is not limited thereto, for it will be clear to one skilled in the art that if desired a plate as at 1 in Figure 1 could be provided with a cylindrical port, the wall of which would be recessed to receive the sealing gasket.

The invention as described has thus provided an air and moisture impermeable seal which may be formed substantially integral with a glass body and which, due to the nature of the materials employed, will be substantially imperceptible to the eye.

This application is related to co-pending applications of Alfred Lippman, Jr., Serial No. 328,207, filed December 27, 1952, and Serial No. 329,423, filed January 2, 1953, assigned to the same assignee as the present invention.

It will be understood that this invention is susceptible to modification in order to adopt it to different usages and conditions and accordingly, it is desired to comprehend such modifications within this invention as may fall within the scope of the appended claims.

I claim:

1. In a method of sealing a port of a glass object which port is defined by wall means of the object, said method comprising the steps of closing the port by compressing a compressible closure against the wall means of the port, flowing a fused inorganic salt over said closure to substantially completely fill the port, said salt having a lower fusion point than that of the glass of the object, setting the fused salt, and while the salt is set but still heated applying a molten glaze which is adherent to the salt over the whole surface of the salt.

2. In a method of sealing a port of a glass object which port is defined by wall means of the object, the steps of supporting a closure in compressive relation with the wall means of the port to close the port, flowing a fused inorganic salt onto said closure and wall means to substantially fill said port, said salt having a lower fusion point than that of the glass of the object, setting the salt, and while the salt is set but still heated applying a molten glaze which is adherent to the salt at a temperature higher than that of the salt over all of the surface of the salt to cause the salt and glaze to interfuse.

3. A method of sealing a port of a glass object comprising the steps of temporarily closing the port by compressing into the port a closure having a heat deformable portion, flowing a fused inorganic salt into said temporarily closed port and over said heat deformable portion to cause the same to spread into the body of the salt, said salt having a lower melting point than that of the glass of the object, and depositing over said salt a film of a moisture proof glaze material which is adherent to the salt and which interfuses with the salt.

4. A method of sealing a port of a glass object comprising the steps of temporarily closing the port, flowing a fused inorganic salt into said port, said salt having a lower melting point than that of the glass of the object, and before said salt has cooled applying a glaze which is adherent to the salt over said salt whereby interfusion of said glaze and salt is attained.

5. A method of sealing a port of a glass object comprising the steps of temporarily closing the port by compressing into the port a closure having a heat deformable portion, fusing an inorganic salt, placing said fused inorganic salt into said substantially closed port to thereby completely close the same and to cause said heat deformable portion to spread into the body of the salt, said salt having a lower melting point than that of the glass of the object, fusing a low melting point glaze which glaze is adherent to the salt, and applying said fused glaze to said inorganic salt in the solidified condition thereof to adhere the glaze to the salt.

6. A method of sealing a port of a glass object comprising the steps of temporarily closing the port by compressing into the port a closure having a heat deformable portion, flowing a fused alkali nitrate having a lower melting point than the glass of the object into said temporarily closed port and over said heat deformable portion to cause said portion to spread into the body of the nitrate, and depositing over said alkali nitrate a film of a moisture proof glaze material which is adherent to the alkali nitrate which interfuses with the alkali nitrate.

References Cited in the file of this patent

UNITED STATES PATENTS 2,720,009    Lippman  ---------------  Oct. 11, 1955